United States Patent [19]

Finkl

[11] Patent Number: 5,393,723

[45] Date of Patent: Feb. 28, 1995

[54] CATALYST FOR IMPROVING THE COMBUSTION AND OPERATIONAL QUALITIES OF HYDROCARBON FUELS

[76] Inventor: Anthony W. Finkl, 445 E. Royal Flamingo, Sarasota, Fla. 34236

[21] Appl. No.: 60,390

[22] Filed: May 11, 1993

[51] Int. Cl.$^6$ .................... B01J 23/02; B01J 23/06
[52] U.S. Cl. .................... 502/341; 502/328; 420/559; 420/580; 420/581; 420/582; 420/587; 420/589; 148/400; 148/405; 148/419; 148/442; 123/538
[58] Field of Search ............ 420/559, 500, 581, 582, 420/587, 589; 148/400, 405, 419, 442; 502/328, 341; C22C 13/02; 123/538

[56] References Cited

U.S. PATENT DOCUMENTS 5,167,782 12/1992 Marlow ........................ 204/168

OTHER PUBLICATIONS

*The Daily Telegraph,* Motoring Section, p. 11, Taking the Cat for a Long Run, by Eric Bailey, Feb. 6, 1993 (NEXIS ® Search).
*Clean Air Network OnLine Today,* Broquet Fuel Catalyst Lowers Emissions, Improves Fuel Efficiency, Apr. 15, 1992 (NEXIS ® Search).
*The financial Times,* Engines Make A Power Play, p. 24, Nov. 14, 1989 (NEXIS ® Search).

*Primary Examiner*—Richard O. Dean
*Assistant Examiner*—Sean Vincent
*Attorney, Agent, or Firm*—Baker & McKenzie

[57] ABSTRACT

The catalyst is provided for improving the performance of hydrocarbon fuels used in internal combustion engines. The catalyst is a based metal alloy catalyst including tin, antimony, lead, mercury and thallium in the following proportions by weight percent:

Sb 18–20
Pb 4.5–5.5
Hg 12–14
Tl 0.1–0.5 and the balance consisting essentially of Sn. The catalyst operates at ambient temperatures and atmospheric pressure. The catalyst is intended to pretreat fuel before combustion and may be disposed in the fuel tank, fuel line or return fuel line.

10 Claims, No Drawings

CATALYST FOR IMPROVING THE COMBUSTION AND OPERATIONAL QUALITIES OF HYDROCARBON FUELS

FIELD OF THE INVENTION

This invention relates generally to catalysts and more specifically to base metal alloy catalysts used in improving the combustion and operational qualities of hydrocarbon fuels for use in internal combustion engines. The catalyst of the present invention includes tin, antimony, lead, mercury and thallium.

BACKGROUND OF THE INVENTION

The general concept of employing a base catalyst to improve the combustibility of hydrocarbon fuels in internal combustion engines is known. Broquet used tin in airplane fuel tanks in the 1940s to enable British aircraft to operate on the low-octane fuel supplied by Russia for English fighter planes sold to Russia. The general concept of using tin as a catalyst was improved upon and marketed as the Broquet Fuel Catalyst by Advanced Power Systems of the United States. The Advanced Power Systems catalyst is a tin alloy and is specifically directed to reducing hydrocarbon emissions in trucks and buses. Power Plus of South Hampton, England markets a fuel catalyst including tin and other alloys to increase engine efficiency. A similar device has been marketed by Power Makers Ltd., also of England.

However, despite numerous attempts during the nearly fifty years since Broquet developed the first tin catalyst to improve the combustion of hydrocarbon fuels, no commercially successful fuel catalyst has been developed for use in internal combustion engines.

Thus, there is a long felt need for a solid catalyst that will improve the operational qualities of hydrocarbon fuels as used in internal combustion engines. Preferably, the improved catalyst would not only increase fuel efficiency but also would decrease emissions to satisfy the current environmental concerns.

SUMMARY OF THE INVENTION

The present invention is a solid base metal alloy catalyst that operates in the presence of iron, copper or silver or alloys thereof. The catalyst may be used by placing it in the fuel storage tank, in the fuel line or in the return fuel line. The shape of the catalyst is relatively unimportant. Shapes including small donuts, washers, spheres, partial spheres, rods, cylinders (both hollow and solid) have been known to perform successfully.

The composition of the catalyst includes tin, antimony, lead, mercury and thallium. The preferred composition of the catalyst is as follows in weight percent:

Tin 60–65.40
Antimony 18–20
Lead 4.5–5.5
Mercury 12–14
Thallium 0.1–0.5

The presence of thallium in the catalyst thereof is deemed essential to the practice of the present invention. The elements of iron or copper or silver must be in the chemical proximity of the catalyst but are not considered to be components of the catalyst.

The catalyst of the present invention operates at atmospheric pressure at temperatures ranging from at least 140° F. to at least −50° F. The operating temperature should be less than the atmospheric boiling temperature of the fuel. The amount of catalyst required depends upon the delivery system as well as the shape of the formed catalyst. If the catalyst is placed in the fuel storage tank, about 20 grams of catalyst will be required per 7.5 kilowatt output of the engine. No weight loss of the catalyst has been detected after 5,000 hours of operation.

It is believed that the catalyst activates the hydrocarbon fuel by altering the distribution of electrical charge across the molecular structure of the fuel molecules prior to combustion. Spectroanalysis shows no chemical change in the composition of the treated fuel. The result is a reduction in the combustion flame propagation time or the time it takes for the ignited fuel to extend from the spark plug to the piston. When the catalyst of the present invention is utilized, the spark may be retarded about 4° in modern engines without any loss of power. Because the engine's spark setting can be retarded 4°, the generation of $NO_x$ as an exhaust gas product will be reduced. Further, use of the catalyst of the present invention will result in increased horsepower because of more energy generated during the combustion process and improved combustion efficiency. Because the hydrocarbon fuel will be more completely burned, the emission of hydrocarbon gases, CO as well as $NO_x$ will be reduced. This result is verifiable with exhaust gas analyzers. Further, carbon deposits within the engine will also be reduced as the deleterious deposits are gradually consumed by the more complete oxidation process within the confines of the combustion chamber.

It is therefore a general object of the present invention to provide a solid catalyst for use with liquid hydrocarbon fuels that result in more complete fuel combustion and higher engine horsepower output.

A related object of the present invention is to provide a catalyst that reduces the flame combustion propagation time so as to allow the spark advance to be retarded without loss of engine power.

Another related object of the present invention is to reduced detrimental exhaust emissions including $NO_x$, CO and hydrocarbon gases.

It is also an object of the present invention to reduce carbon deposits within the combustion chamber as well as wax-like precipitates that can cause fuel blockage in the engine during cold operating conditions.

Yet, other objects of the present invention include increased valve life and increased engine life.

Still further objects of the present invention include an apparent increase in the octane rating of the catalyst-treated fuel.

Another benefit is the reduced oxidation and deterioration of the fuel during prolonged periods of storing the fuel in the fuel tank reducing fuel varnish and the attack on gaskets and seals in storage tanks, carburetors, and fuel injectors.

Other objects and advantages of the invention will be apparent to those of ordinary skill in the art from the following detailed description.

DETAILED DESCRIPTION OF THE INVENTION

The composition may be characterized for convenience as a ten-mercury-antimony-lead-thallium composition of the following general formula in weight percent:

Tin 60–65.40

Antimony 18–20
Lead 4.5–5.5
Mercury 12–14
Thallium 0.1–0.5

Tin is necessary as a support for the remaining components and further it is known that tin acts as a lubricate to the upper cylinder area of the engine. If tin is present in an amount substantially less than 50%, then these objectives will not be met and further it is believed that the distribution of electrical charge over the molecular structure of the fuel molecules will not be substantially altered. It is believed that no detrimental effect would result in tin being present in an excess of 70%, however tin in excess of this weight percent would lower the amount of the other constituents thereby adversely affecting the performance of the catalyst.

The combination of antimony, lead and mercury will work effectively with tin in altering the distribution of electrical charge over the molecular structure of the hydrocarbon molecules. Antimony should be present in amounts ranging from 15% to 25% and preferably from about 18% to about 20%. Lead should be present in amounts ranging from 3% to 7% and preferably from about 4.5% to about 5.5%. Mercury should be present in amounts ranging from 10% to 16% and preferably from about 12% to about 14%.

It is also believed that the addition of thallium to the above-mentioned combination will substantially increase the activity and effectiveness of the catalyst. The amount of thallium required is not excessive and thallium need only be present in an amount ranging from 0.05% to about 1% and preferably from about 0.1% to about 0.5%. Thallium in excess of this amount will adversely affect the economics of the catalyst without substantially increasing the performance of the catalyst and therefore thallium in amounts greatly exceeding 0.5% are not preferred.

The catalyst may be utilized by placing a sufficient quantity in the fuel storage tank. Another preferred method of utilizing the catalyst is to place the catalyst within a cartridge disposed in the fuel line. Fuel would enter one end of the cartridge from the fuel tank or fuel pump and the fuel exiting the cartridge would be thereafter transported to the carburetor or fuel injector. Another alternative would be to use a similar cartridge in the fuel return line leading from the engine to the fuel storage tank.

Various shapes of the formed catalyst will be effective. Specifically, small donuts, washer-shaped, spheres, partial spheres, rods or cylinders will be effective. The shapes may be hollow or solid depending upon the amount of the surface area required.

The catalyst of the present invention provides numerous benefits that improve engine performance, increase engine life and increase component life. Specifically, spark plug electrode erosion is greatly reduced when the catalyst of the present invention is used to process fuel prior to combustion. During normal engine operation, coatings are formed on the electrode and on the ceramic insulator of the spark plug. When the catalyst of the present invention is used to process the fuel prior to ignition at the spark plug, these coatings are greatly reduced to a point where the ceramic insulator appears new after several thousand miles of operation. As a result of the reduction of these two spark plug deterrents, spark plug life is doubled when compared to the accepted spark plug life for the ignition systems that were evaluated including coil systems, condenser systems, points systems, capacitor discharge systems, or pointless electronic systems.

Another deterrent to engine performance addressed by the catalyst of the present invention is crankcase sludges. The crankcase sludges generated when the fuel is treated with the catalyst of the present invention gradually go into solution in the oil and are thereafter filtered out by a standard oil filter. Because of this cleansing operation, additional oil filter changes are recommended such as every 2,000 miles for the first 6,000 miles. With new or rebuilt engines, the filter changes may be extended to every 6,000 miles for normal operating conditions of gasoline engines and every 300 hours for diesel engines after the recommended "break-in period".

The catalyst of the present invention also eliminates or greatly reduces other deposits commonly found in engines. Specifically, varnish-like piston wall coatings, carbon deposits on piston domes and the top ring areas as well as the sludge in the oil control ring are almost completely eliminated or at least greatly reduced in less than 6,000 miles after the employment of a catalyst made in accordance with the present invention.

All of the above engine improvements are the result of the catalyst treated fuel that provides an internally cleaner engine with less oil contamination resulting in fewer oil changes, less filter changes, longer spark plug life and increased engine life.

The catalyst of the present invention also addresses certain environmental concerns. Specifically, the catalyst provides a more complete combustion process and therefore reduces detrimental exhaust emissions and will extend the acceptable use of internal combustion engines well into the 21st century.

Thus, an improved catalyst for treating hydrocarbon fuels is disclosed. The catalyst is a base metal alloy catalyst that includes tin and thallium. No weight change will be detected in catalyst made in accordance with the present invention after 5,000 hours of active service. Thus, the ultimate durability of the catalyst made in accordance with the present invention has yet to be determined.

While only certain embodiments have been set forth, alternative embodiments in various modifications to the formulations set forth above will be apparent to those skilled in the art. These and other alternatives are considered equivalents and within the spirit and scope of the present invention.

I claim:

1. A catalyst for improving the performance of hydrocarbon fuels in internal combustion engines, the catalyst consisting essentially of the following composition in weight percent:

Sb 18–20
   Pb 4.5–5.5
   Hg 12–14
   Tl 0.1–0.5, and the balance consisting essentially of Sn.

2. The catalyst of claim 1,
   further comprising at least one additional metal selected from the group consisting of Fe, Cu and Ag, the additional metal being present in an amount from about 0.01% to about 0.1%.

3. The catalyst of claim 1,
   wherein said catalyst is provided in solid form having a shape of small donuts, washer-shaped, spheres, partial spheres, rods (solid), cylinders (solid), rods (hollow) or cylinders (hollow).

4. A base metal alloy catalyst for altering the molecular charge structure of hydrocarbon fuels, the catalyst consisting essentially of the following composition in weight percent:
Sb 15-25
Pb 3-7
Hg 10-6
Tl 0.05-1
and the balance consisting essentially of Sn.

5. The catalyst of claim 4, wherein said Antimony is present in an amount of from about 18% to about 20% by weight.

6. The catalyst of claim 4, wherein said Lead is present in an amount of from about 4.5% to about 5.5% by weight.

7. The catalyst of claim 4, wherein said Mercury is present in an amount of from about 12% to about 14% by weight.

8. The catalyst of claim 4, wherein said Thallium is present in an amount of from about 0.1% to about 0.5% by weight.

9. The catalyst of claim 4, wherein said catalyst is provided in solid form having a shape of small donuts, washer-shaped, spheres, partial spheres, rods (solid), cylinders (solid), rods (hollow) or cylinders (hollow).

10. The catalyst of claim 4, further comprising at least one additional metal selected from the group consisting of Fe, Cu and Ag, the additional metal being present in an amount from about 0.01% to about 0.1%.

* * * * *